United States Patent

Irvin

[15] 3,641,729
[45] Feb. 15, 1972

[54] LIP CLINCHING DIES AND JOINT PRODUCED THEREFROM

[72] Inventor: Donald G. Irvin, Burlington, Ontario, Canada

[73] Assignee: H. H. Robertson Company, Pittsburgh, Pa.

[22] Filed: Feb. 10, 1970

[21] Appl. No.: 10,223

[30] Foreign Application Priority Data

Mar. 14, 1969 Canada..................................45813

[52] U.S. Cl...........................................52/528, 52/537, 52/588
[51] Int. Cl.............................................E04d 3/362
[58] Field of Search..................52/588, 521, 528, 537, 465, 52/478, 542, 748, 674; 287/189.36 D

[56] References Cited

UNITED STATES PATENTS

| 182,193 | 9/1876 | Holeton | 52/528 |
| 317,381 | 5/1885 | Langenau | 52/467 |
| 426,627 | 4/1890 | Sagendorph | 52/465 X |
| 460,850 | 10/1891 | Curtis | 52/674 |

FOREIGN PATENTS OR APPLICATIONS

| 793,044 | 8/1968 | Canada | 52/528 |
| 1,150,589 | 8/1957 | France | 52/518 |

*Primary Examiner*—Alfred C. Perham
*Attorney*—Harry B. Keck and George E. Manias

[57] ABSTRACT

A shear lock connection for securing interengaged connecting lips of adjacent sheet member panels firmly together. The connection comprises two lobes produced in the connecting lips by sequential shearing and displacement operations. The lobes are displaced equally in opposite directions to achieve a connection of improved longitudinal shear resistance and improved vertical pullout resistance. Apparatus is described for producing the shear lock connection.

6 Claims, 7 Drawing Figures

PATENTED FEB 15 1972   3,641,729

INVENTOR.
DONALD G. IRVIN
By George E. Manias
AGENT

LIP CLINCHING DIES AND JOINT PRODUCED THEREFROM

BACKGROUND OF THE INVENTION

1. Field of the Invention

This invention relates to flooring, roofing and siding assembled from plural sheet metal panels, and more particularly to a shear lock connection for securing interengaged connecting lips of adjacent sheet member panels firmly together and apparatus for producing the same.

2. Description of the Prior Art

The prior art contains several examples of connections adapted to secure interengaged connecting lips of adjacent panels firmly together. The most common type of connection comprises deforming the interengaged connecting lips to provide a button or dimple. See for example Canada Pat. No. 793,044. The button or dimple may be formed by the power operated tool described in Canada Pat. No 793,044 or by manually operated tools normally in the form of large tongs. In either instance, the tool includes a pair of opposed jaw carrying complementary dielike elements, one in the form of a projection and the other in the form of a recess. When the tool is operated, the projection deforms and displaces portions of the interengaged connecting lips into the recess to provide a button or dimple.

Other forms of connections are also known. For example, the jaws of the tool may be provided with a cutter and a recess, similar to those shown in U.S. Pat. No. 824,551. In this instance, a generally V-shaped tab is cut in the interengaged connecting lips and bent out of the plane thereof.

Because of the limited shear strength of the connections produced by button punching or Z-tab punching, a large number of connections are generally required.

SUMMARY OF THE INVENTION

The principal object of this invention is to provide a shear lock connection for securing the interengaged connecting lips of adjacent panels firmly together.

Another object of this invention is to produce two lobes in the connecting lips by sequential shearing and displacement operations, the lobes being displaced equally in opposite directions to achieve a connection of improved longitudinal shear resistance and improved vertical pullout resistance.

A further object of this invention is to provide apparatus for producing the shear lock connection.

The present invention provides improvements in a joint between sheet metal panels wherein a male lip of one panel is engaged in a female lip of an adjacent panel to provide an upstanding seam having a region of three sheet metal plies and presenting opposite seam faces.

In accordance with the present invention, the male lip and the female lip have aligned slits in the region of three sheet metal plies. The aligned slits have opposite ends disposed in a common plane and opposed slit edges. Lobes are formed in the region of three sheet metal plies, one on each side of the common plane and intermediate of the coplanar ends of the aligned slits. The lobes project in opposite direction, one laterally outwardly of each of the opposite seam faces.

In particular, the two lobes are produced in the upstanding seam by sequential shearing and displacement operations. That is, the upstanding seam is sheared along the common plane to provide sets of slit edges above and below the common plane. Thereafter, each set of slit edges and portions of the upstanding seam adjoining the set of slit edges are displaced equally in opposite directions to create the aforesaid lobes. The coplanar ends of the aligned slits may extend longitudinally of the upstanding seam. Alternatively, the coplanar ends of the aligned slits, instead, may extend diagonally across the upstanding seam.

Further in the course of this invention, a clinching tool is provided for producing the shear lock connection of this invention. The clinching tool is of the type having a pair of pivotal jaws presenting opposed jaw faces and means forcibly moving the pivotal jaws toward and away from each other. The pivotal jaws are provided with essentially identical diemembers, one extending from each of the jaw faces. The diemembers have body portions of generally semiconical configuration which present matching generally flat die surfaces disposed on opposite sides of an imaginary plane extending generally perpendicular to the jaw faces. The matching generally flat die surfaces are moved into opposed relation when the pivotal jaws are moved toward each other. The edges of the flat die surfaces serve as complementary cutting edges for shearing the upstanding seam along the aforesaid common plane.

DESCRIPTION OF THE PREFERRED EMBODIMENT(S)

Figure 1:
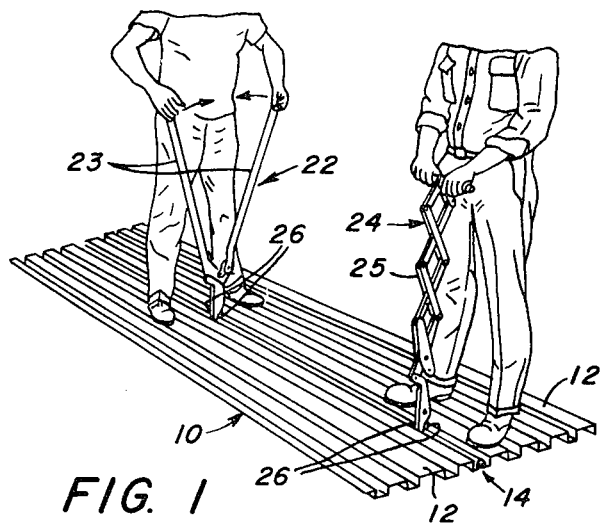
FIG. 1 is a fragmentary perspective view of a floor or roof structure assembled from plural sheet metal panels, illustrating typical lip clinching tools.
Figure 3:
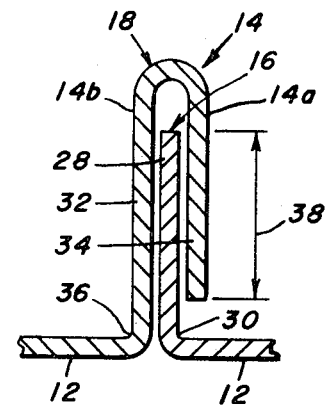
FIG. 3 is a cross-sectional view of the upstanding seam of FIG. 2.
Figure 2:
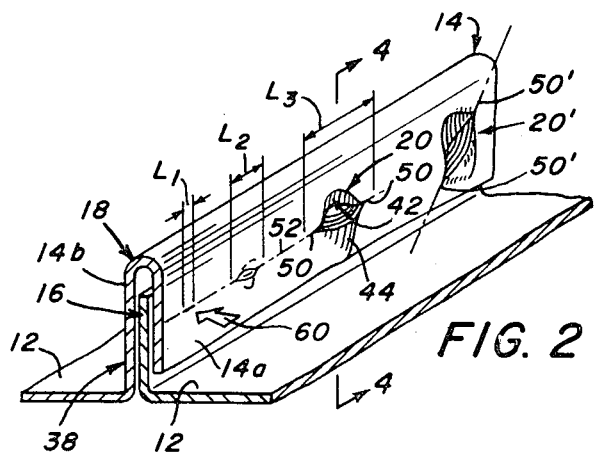
FIG. 2 is a fragmentary isometric view of an upstanding seam illustrating shear lock connections of this invention.

Referring to FIG. 1, there is illustrated a supporting structure 10 which may comprise a roof or a floor of a building. The supporting structure 10 is assembled from plural corrugated sheet metal panels 12 connected along an upstanding seam or joint 14. As shown in FIGS. 2 and 3, the upstanding seam 14 presents opposite seam faces 14a, 14b and may comprise a male lip 16 and a female lip 18 formed along the opposite longitudinal edges of each of the sheet metal panels 12. When mated, the male lips 16 of one sheet panel 12 is embraced by the female lip 18 of an adjacent sheet panel 12. As shown in FIG. 2, the male lip 16 and the female lip 18 are firmly secured together by shear lock connections 20, 20' of this invention.

As illustrated in FIG. 1, the shear lock connection 20 of this invention, may be formed by hand tools such as the prior art tongs 22. Alternatively, the shear lock connections 20 of this invention may be formed by the clinching tool 24 which is described and illustrated in my copending application, Ser. No. 876,536, filed Nov. 13, 1969 and assigned to the assignee of this invention. Each of the hand tools 22, 24 includes pivotal jaw members 26 which are provided with essentially identical die members (not visible) which will be described in greater detail later in the specification. The pivotal jaw members 26 embrace the upstanding seam 14 and are subsequently forced together to perform the clinching operation.

The hand tools 22, 24 are provided with means for forcibly moving the pivotal jaw members toward and away from each other. The jaw members 26 of the hand tool 22 are operated by a pair of handles 23. The jaw members 26 of the hand tool 24 are operated by a contractable and extensible jaw operating mechanism 25. A complete description of the construction and operation of the mechanisms 25 will be found in the aforesaid copending application, Ser. No. 876,536.

Referring to FIG. 3, the male lip 16 comprises an upstanding flange 28 formed along an opposite longitudinal edge 30 of the sheet metal panel 12. The female lip 18 comprises an upstanding flange segment 32 terminating in a downwardly extending flange segment 34. The female lip 18 is formed along the opposite longitudinal edge 36 of the sheet metal panel 12. When mated, the male lip 16 and the female lip 18 present a region of three sheet metal plies, indicated by the dimension line 38.

Figure 4:
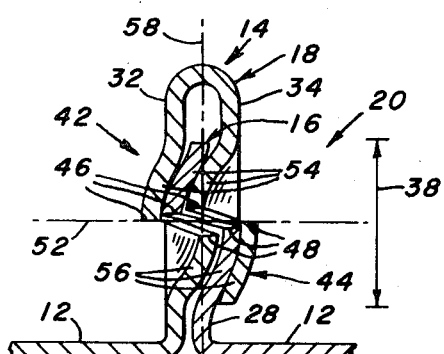
FIG. 4 is a cross-sectional view taken along line 4—4 of FIG. 2 further illustrating the shear lock connection of this invention.

Referring to FIG. 4, the shear lock connection 20 comprises aligned slits 40 and two lobes 42, 44 formed in the region 38 of the male and female lips 16, 18. The aligned slits 40 present opposed slit edges 46, 48 and include slit ends 50 (visible in FIG 2) residing in a common plane indicated by the dash-dot line 52 in FIG. 4.

As best shown in FIG. 4, the lobes 42, 44 are disposed of opposite sides of the common plane 52. The lobe 42 consists of three sheet metal portions 54 of the upstanding flange 28 and the flange segments 32, 34. Similarly, the lobe 44 consists of three sheet metal portions 56 of the upstanding flange 28 and the flange segments 32, 34. The portions 54, 56 terminate in the opposed slit edges 46, 48 respectively.

Figure 5:
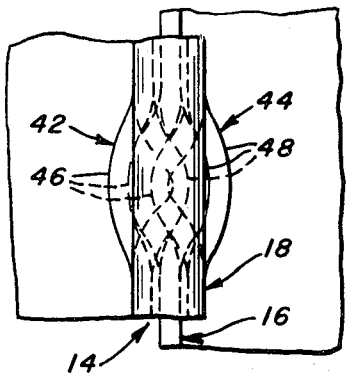
FIG. 5 is a fragmentary plan view of the shear lock connection illustrated in FIG. 4.

During the formation of the shear lock connection 20, the portions 54, 56 are displaced equally in opposite directions relative to a plane 58 extending centrally through the female lip 18 and generally perpendicular to the common plane 52. As a result, the lobes 42, 44 have central portions residing substantially entirely on opposite sides of the imaginary plane 58. As best shown in FIG. 5, the slit edges 46, 48 of each of the lobes 42, 44 have corresponding arcuate configurations.

As schematically illustrated in FIG. 2, the shear lock connection 20 is formed by the application of opposed shearing forces, one shearing force being represented by the arrow 60, to the opposite seam faces 14a, 14b and along the common plane 52. Such application of opposed shearing forces will create aligned slits of increasing length, represented by the dimension lines $L_1$, $L_2$, and $L_3$. During the shearing operation, the opposed slit edges 46, 48 (FIG. 4) are displaced equally in opposite directions while simultaneously, the portions 54, 56 (FIG. 4) adjoining the respective slit edges 46, 48 are deformed to create the oppositely extending lobes, 42, 44.

As shown in FIG. 2, the coplanar ends 50 of the shear lock connection 20 may extend longitudinally of the upstanding seam 14. Alternatively, the coplanar slit ends 50' of the shear lock connection 20' may extend diagonally across the upstanding seam 14.

Figure 6:
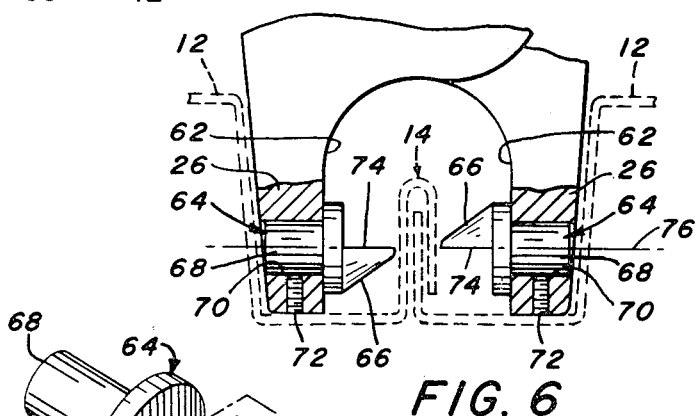
FIG. 6 is a fragmentary side view of opposed jaw faces, partly in cross section, illustrating essentially identical die members for producing the shear lock connection of this invention.
Figure 7:
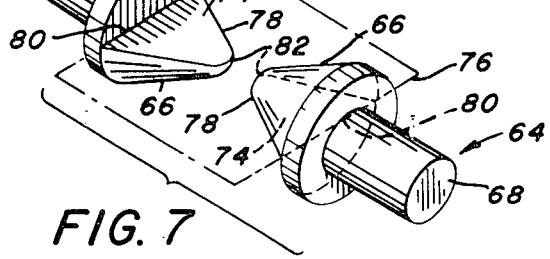
FIG. 7 is a isometric view further illustrating the configuration of the essentially identical die members of FIG. 6.

The present invention also provides an improved clinching tool, illustrated in part in FIGS. 6 and 7, for producing the shear lock connection of this invention. As shown in FIG. 6, the pivotal jaw members 26 present opposed jaw faces 62. Essentially identical die members 64 are provided each having a body portion 66 extending from one of the opposed jaw faces 62. The die members 64 include shanks 68 projecting into bores 70 formed in the pivotal jaw members 26. Set screws 72 secure the die members 64 to the pivotal jaw members 26.

The body portions 66 of the essentially identical die member 64, present matching generally flat die surfaces 74 disposed on opposite sides of an imaginary plane 76 which extends generally perpendicular to the opposed jaw faces 62 (FIG. 6). The edges 78 (FIG. 7) of the matching generally flat die surfaces 74 serve as complementary cutting edges.

As best shown in FIG. 7, the body portions 66 have a semiconical configuration. The flat die surfaces 74 include a first end 80 and a second end 82 remote from the first end 80. The second end 82 has an arcuate configuration. Moreover, the flat die surfaces 74 have a diminishing width from the second end 82 to the first end 80.

Referring again to FIG. 6, it will be seen that the essentially identical die members 64 are positioned such that the body portions 66 thereof extend in opposite direction away from the imaginary plane 76. Accordingly, when the pivotal jaws are forcibly moved toward each other, the matching flat die surfaces 74 will be moved into opposed relation. The upstanding seam 14 between adjacent sheet metal panels 12 is shown in dotted outline to illustrate the positions of the pivotal jaws 26 and the die member 64 relative to the sheet metal panels 12 and the upstanding seam 14 prior to the formation of a shear lock connection.

I claim:
1. In a joint between sheet metal panels wherein a male lip of one panel is engaged in a female lip of an adjacent panel to provide an upstanding seam having a region of three sheet metal plies and presenting opposite seam faces; the improvement comprising:

said male lip and said female lip having aligned slits in said region of three sheet metal plies, said aligned slits having opposite slit ends disposed in a common plane and presenting sets of slit edges, one of each side of said common plane; and opposed lobes formed in said region of three sheet metal plies, one on each side of said common plane and intermediate of said opposite slit ends, said lobes projecting in opposite directions, one laterally outwardly of each of said opposite seam faces;

said aligned slits constituting the only break in said upstanding seam associated with said opposed lobes.

2. The improvement defined in claim 1 wherein said opposed slit ends extend longitudinally of said upstanding seam.

3. The improvement defined in claim 1 wherein each lobe consists of three sheet metal portions of said male lip and said female lip, and terminates in one of said sets of slit edges.

4. The improvement defined in claim 3 wherein the set of slit edges of each lobe have corresponding arcuate configurations.

5. The improvement defined in claim 3 wherein the sets of slit edges of said lobes have central portions residing substantially entirely on opposite sides of an imaginary plane extending centrally through said female lip and generally perpendicular to said common plane.

6. The improvement defined in claim 1 wherein said opposite slit ends extend diagonally across said upstanding seam.

* * * * *